United States Patent
Xiao et al.

(10) Patent No.: US 6,917,747 B2
(45) Date of Patent: Jul. 12, 2005

(54) COMPACT HYBRID INTEGRATED OPTICAL DYNAMIC CHANNEL EQUALIZER

(75) Inventors: Gaozhi Xiao, Ottawa (CA); Zhiyi Zhang, Ottawa (CA); Zhenguo Lu, Gloucester (CA); Jiaren Liu, Kanata (CA); Chander P. Grover, Gloucester (CA)

(73) Assignee: National Research Council of Canada, Ottawa (CA)

( * ) Notice: Subject to any disclaimer, the term of this patent is extended or adjusted under 35 U.S.C. 154(b) by 184 days.

(21) Appl. No.: 10/372,851

(22) Filed: Feb. 26, 2003

(65) Prior Publication Data

US 2004/0165857 A1 Aug. 26, 2004

(51) Int. Cl.[7] .................................................. G02B 6/26
(52) U.S. Cl. ............................. 385/140; 385/14; 385/24
(58) Field of Search ............................. 385/14, 129, 24, 385/140

(56) References Cited

U.S. PATENT DOCUMENTS

| | | | | |
|---|---|---|---|---|
| 5,815,299 A | * | 9/1998 | Bayart et al. .................. 398/94 |
| 5,923,472 A | * | 7/1999 | Bergmann .................... 359/618 |
| 5,933,270 A | | 8/1999 | Toyohara | |
| 6,144,784 A | * | 11/2000 | Shigehara et al. ............. 385/24 |
| 6,345,133 B1 | | 2/2002 | Morozov | |
| 6,487,336 B1 | * | 11/2002 | Yao ............................... 385/24 |

* cited by examiner

*Primary Examiner*—John D. Lee
*Assistant Examiner*—James D. Stein
(74) *Attorney, Agent, or Firm*—L. Anne Kinsman; Borden Ladner Gervais LLP

(57) ABSTRACT

An integrated optical dynamic channel equalizer that can be employed to equalize the channel gain level in a WDM transmission line and monitor the optical channel performance. The device consists of a circulator, a dynamic gain equalizer chip and a controller. Due to the simplicity of the dynamic gain equalizer chip, which includes one 1×n multiplexer/demultiplexer, an n-channel variable optical attenuator array (VOA-n), a partially transparent dielectric reflective means and an n-channel detector array, the device is very compact and can be fabricated at low cost. By placing a quarter wave plate between the n-channel variable optical attenuator array and the partially transparent reflective means in the dynamic channel equalizer chip, the device can be rendered polarization insensitive.

13 Claims, 6 Drawing Sheets

Optical channel (nm)
before equalization

Optical channel (nm)
after equalization

COMPACT HYBRID INTEGRATED OPTICAL DYNAMIC CHANNEL EQUALIZER

FIELD OF THE INVENTION

The present invention relates generally to optical dynamic channel equalizers. More particularly, the present invention relates to an optical dynamic channel equalizer for application in optical communication networks, particularly, an optical channel equalizer for a WDM network where multiple channels of optical signals are transmitted through an optical transmission line.

BACKGROUND OF THE INVENTION

Increasing demand for transmission capacity, high-speed, and/or long-distance data transmissions among multiple users has pushed the development and deployment of fiber-optic communication systems. Technologies making these feasible include wavelength division multiplexing (WDM), and erbium doped fiber amplification (EDFA). In a WDM system, many different wavelength channels are transmitted simultaneously along the optical fibers or data transmission lines. This dramatically increases the capacity of the transmission system and permits wavelength dependent optical network routing. On the other hand, EDFA amplifies multiple channel optical signals over a wide bandwidth without converting the optical signals into electronic signals and back to optical signals. It also offers several advantages including high gain, low additive noise, and fiber compatibility. However, due to the existence of non-uniform EDFA gain with wavelength, variable channel insertion losses in the components, neighboring channel addition and deletion, unstable laser power, microsecond long gain transients in EDFA cascades, etc., the gain levels of different channels in an optical network are varied. This hinders the proper functioning of optical networks. With the channel power variation, the lower gain channels progressively lose power relative to the higher gain channels, causing a significant power and signal to noise ratio (SNR) differential among the various channels, and limiting the transmission distance and usable amplifier bandwidth.

In addition, as channel powers vary in a dynamic network, several system complications may arise which can potentially cause network failure, such as changes in the input signal powers, drift in component wavelength selectivity, changes in link losses and changes in amplifier gain. Thus, it is advantageous to equalize variation in channel gain level for any wavelength dependent element in the optical transmission path.

Various types of optical dynamic channel equalizer have been proposed or developed in recent years, but most of them are expensive and bulky. FIG. 1 (prior art) shows the general operation of such a dynamic channel equalizer as disclosed by U.S. Pat. No. 6,345,133. In operation, a signal is first applied to a demultiplexer (DMUX) 80 and de-multiplexed into its corresponding channels. Each channel then goes through a dedicated variable optical attenuator (VOA) in an array 81, then all channels are multiplexed by a multiplexer (MUX) 82. After multiplexing, an optical channel monitor (OCM) 83, which includes a tap 831, a DMUX 832 and a detector array 833, and a dynamic equalizer controller 84, is used to monitor the performance of each channel passed through the device, and feed the data to the VOA control unit, which then equalizes the signal of each channel by attenuating each channel to its required level. As can be seen from FIG. 1, such a dynamic channel gain equalizer uses one MUX and two DMUXs, which renders the devices expensive and bulky.

U.S. Pat. No. 5,933,270 discloses a more compact optical equalizer. One embodiment (as illustrated in FIG. 2) comprises a circulator 90, a WDM coupler 91 and a plurality of variable light attenuators 92 that are separately connected to the plurality of ports of the WDM coupler 91. Each attenuator 92 is connected to the input port of an optical coupler (tap) 93 that has one output port connected to a controller 94, and one output port to a reflector 95. Due to the employment of the optical coupler 93, the manufacture of such a device is relatively complicated and expensive.

Therefore, it is desirable to provide an optical channel equalizer that is compact and inexpensive to manufacture. Preferably, such an equalizer requires fewer components than the equalizers of the prior art.

SUMMARY OF THE INVENTION

It is an object of the present invention to obviate or mitigate at least one disadvantage of previous optical dynamic channel equalizers as exemplified above.

In a first aspect, the present invention provides a dynamic optical channel equalizer. The equalizer comprises an optical demultiplexer, a variable optical attenuator array, a partially transparent reflector and an equalization controller. The optical demultiplexer receives an optical signal and demultiplexes it into a plurality of optical channel signals. The variable optical attenuator array has a plurality of variable optical attenuators. Each variable optical attenuator receives and attenuates one of the plurality of optical channel signals. The partially transparent reflector is positioned to reflect a portion of each attenuated optical channel signal to an optical multiplexer, and to transmit a portion of the remainder of each attenuated optical channel signal. The equalization controller receives the transmitted portions and controls each variable optical attenuator, by feedback, based on a comparison between a required gain level and an actual gain level of its respective optical channel signal to equalize channel gain.

In preferred embodiments, the partially transparent reflector abuts the variable optical attenuator array. It can be, for example, a dielectric multilayered interference film formed on a facet of the variable optical attenuator array. A channel detector array is placed adjacent the reflector. The array can, for example, be bonded to the interference film. The channel detector array has a plurality of optical channel signal detectors for detecting the intensity of each transmitted portion, and for providing the detected intensities to the equalization controller. In a presently preferred embodiment, the variable optical attenuator array, the partially transparent reflector and the channel detector array are integrated on a semiconductor chip. In the preferred embodiment, a wave division multiplexer/demultiplexer forms both the optical demultiplexer and the optical multiplexer. The received optical signal is fed to and received from the wave division multiplexer/demultiplexer by an optical circulator, while the reflected portion of each attenuated optical channel signal is reflected to the wave division multiplexer/demultiplexer through the variable optical attenuator array.

In a further embodiment, to provide polarization insensitivity, a quarter wave plate is inserted between the variable optical attenuator array and the partially transparent reflector. Preferably, is bonded to the variable optical attenuator array, and the partially transparent reflector is a dielectric multilayered interference film formed on a surface of the quarter wave plate. It is also possible to include temperature determination means for determining the temperature of the semiconductor chip based on the actual gain levels.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for equalizing channel gain levels in a WDM transmission line. In its simplest embodiment, the equalizer comprises an optical demultiplexer, a variable optical attenuator array, a partially transparent reflector and an equalization controller. The optical demultiplexer receives an optical signal and demultiplexes it into a plurality of optical channel signals. The variable optical attenuator array has a plurality of variable optical attenuators. Each variable optical attenuator receives and attenuates one of the plurality of optical channel signals. The partially transparent reflector is positioned to reflect a portion of each attenuated optical channel signal to an optical multiplexer, and to transmit a portion of the remainder of each attenuated optical channel signal. The equalization controller receives the transmitted portions and controls each variable optical attenuator, by feedback, based on a comparison between a required gain level and an actual gain level of its respective optical channel signal to equalize channel gain.

Figure 1:
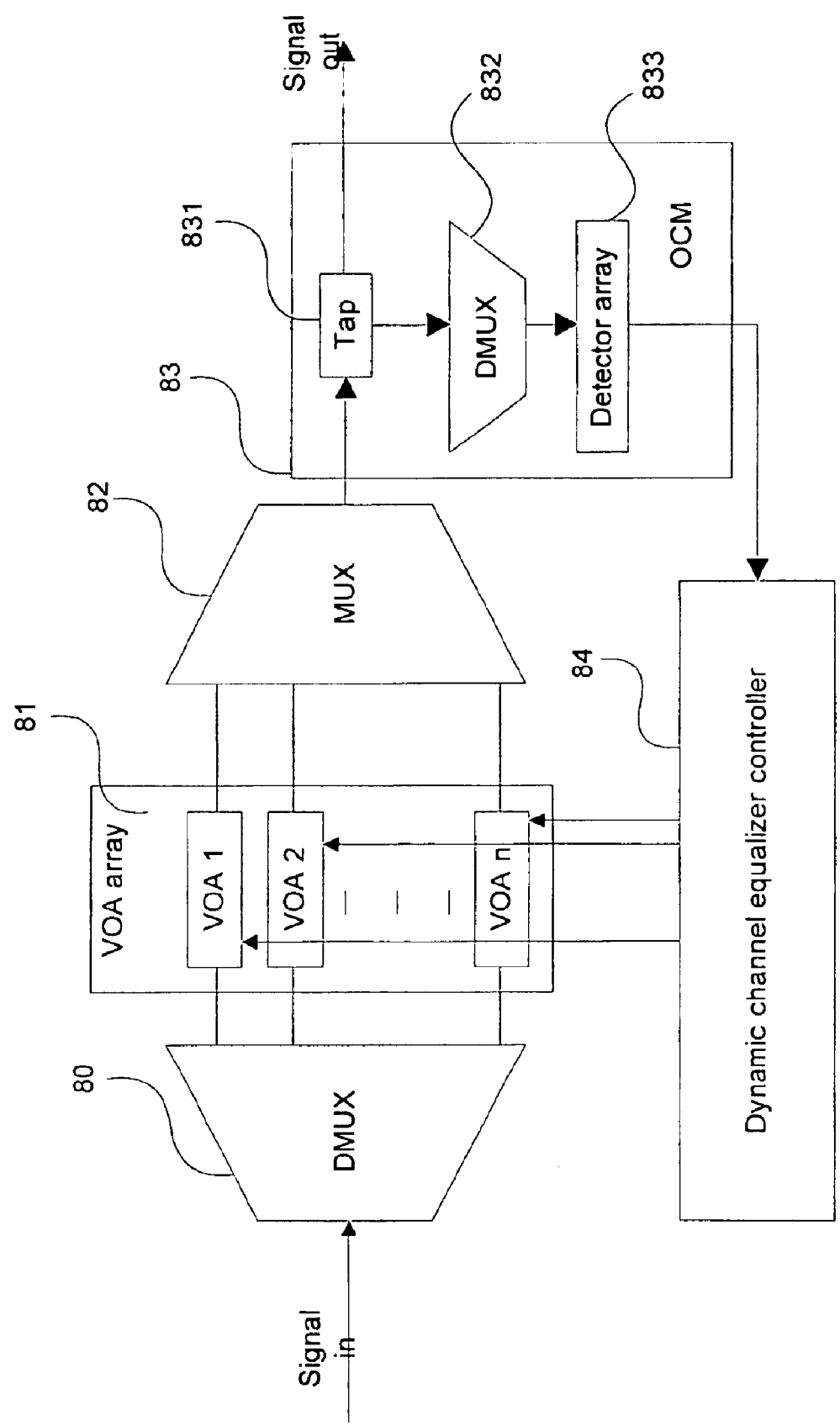
FIG. 1 is a block diagram showing a dynamic channel equalizer of the prior art.
Figure 2:
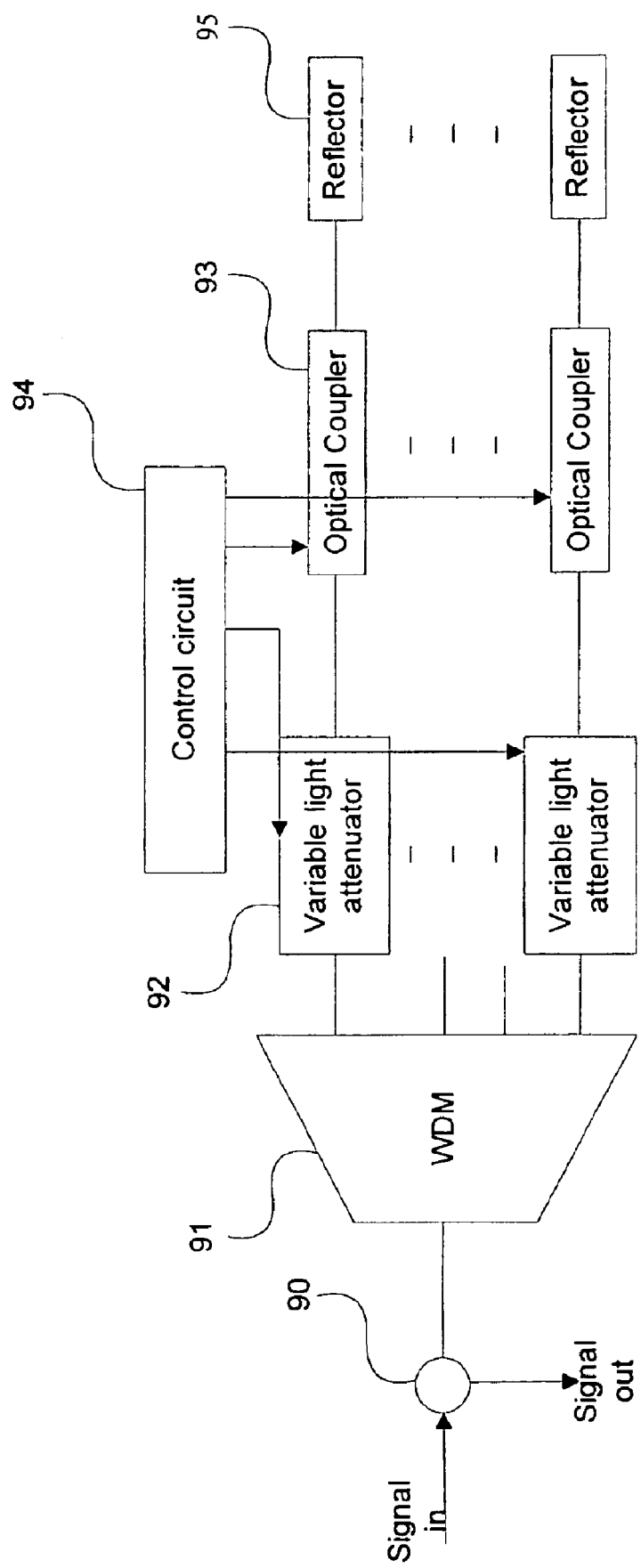
FIG. 2 is a block diagram showing another dynamic channel equalizer of the prior art.
Figure 3:
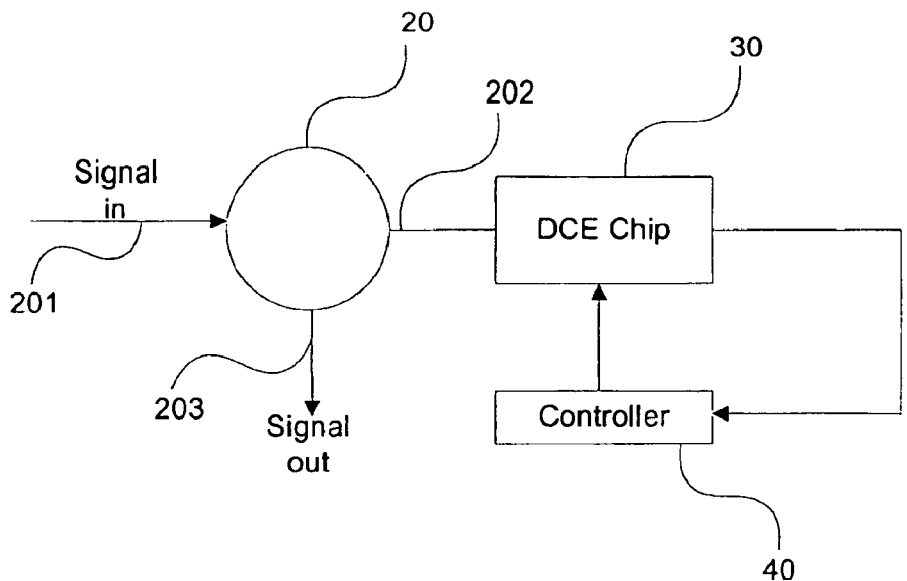
FIG. 3 is a block diagram of an optical channel equalizer in accordance with the present invention.

FIG. 3 illustrates a first preferred embodiment of an optical dynamic channel gain equalizer in accordance with the invention. In this embodiment, an optical dynamic channel equalizer 10 comprises an optical circulator 20, an integrated dynamic channel equalizer (DCE) chip 30 and a DCE controller 40. The circulator 20 has three ports. The input port 201 is used as the signal input from the optical transmission line, output port 203 is used as the signal output to an optical transmission line, while input/output port 202 is connected to the DCE chip 30 by an optical fiber.

Figure 4:
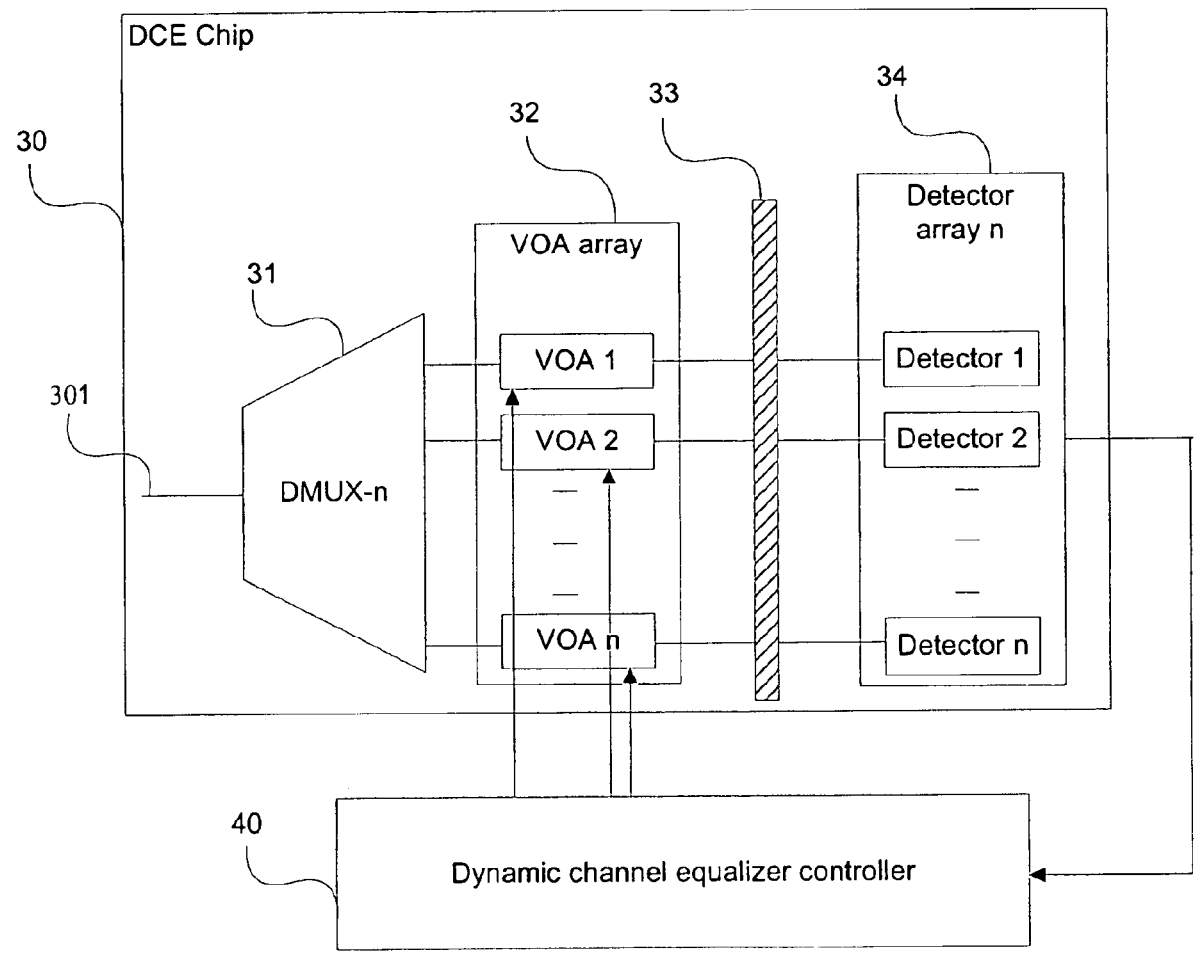
FIG. 4 is a diagram illustrating of the dynamic channel equalizer chip shown in FIG. 3.

The DCE chip 30 (as shown in FIG. 4) is composed of several elements including a waveguide based 1×n multiplexer/demultiplexer (MUX/DMUX) 31, which is preferably an arrayed waveguide grating (AWG), a variable optical attenuator array (VOA) 32, preferably a waveguide based VOA array, a partially transparent reflective means 33, which is coated on the VOA array facet, and a detector array 34, which is bonded to the reflective means by an adhesive or other suitable means. The waveguide materials used are selected from semiconductor materials, silica, polymers and other materials, as are well known to those skilled in the art. In addition, the MUX/DMUX 31 and VOA 32 can be either monolithically integrated, hybrid integrated or butt coupled. The main functions of the dynamic channel equalizer controller 40 include optical channel monitoring, independent control of each VOA, and DCE chip temperature monitoring and control.

Figure 6:
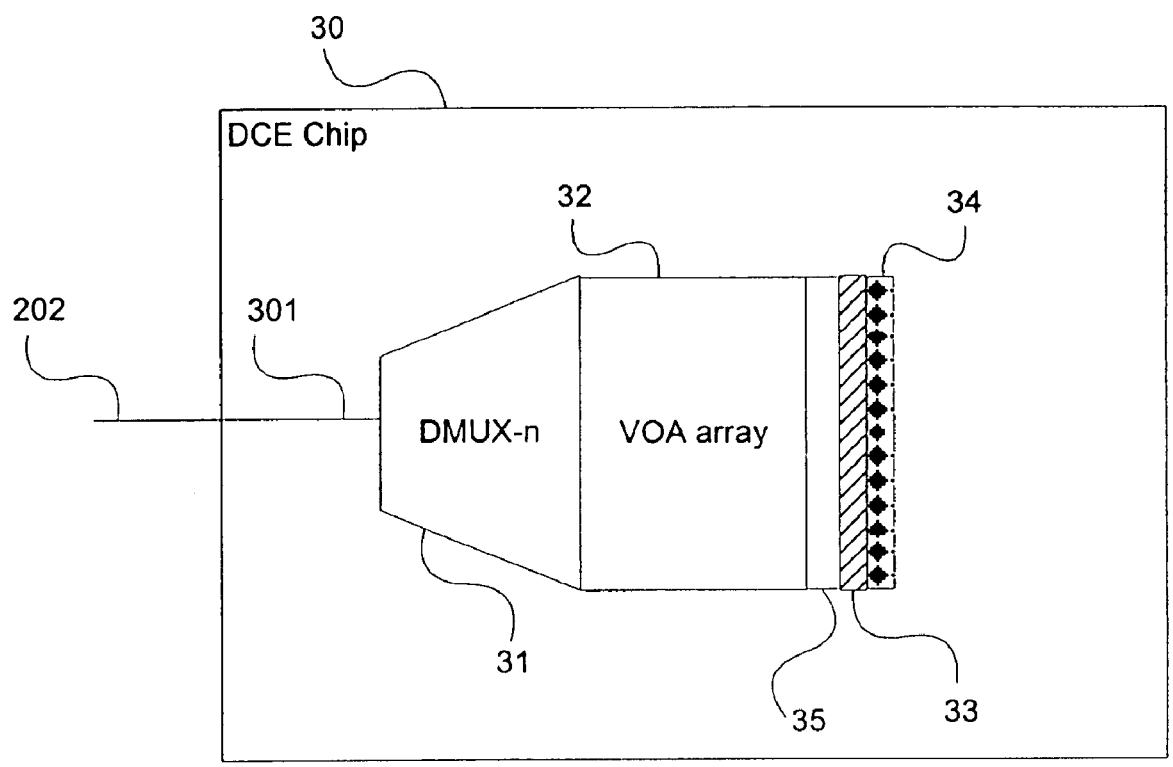
FIG. 6 is a block diagram showing a polarization insensitive embodiment of the dynamic channel equalizer in accordance with the present invention.

Referring to FIGS. 3 and 4, a multi-channel optical signal transmitting through the transmission line is input to the input port 201 of the circulator 20 and then is transmitted to the input/output port 202 of the circulator 20. The optical signal output from input/output port 202 of the circulator 20 is input to the input port 301 of the DCE chip 30 and demultiplexed into n-channels by MUX/DMUX 31. The signal of each channel is fed into its corresponding variable optical attenuator in the VOA array 32 and attenuated to its required gain level by the controller 40. The majority signal passing through each VOA will be reflected back to the attenuator by the partially transparent reflective means 33 and attenuated again. The twice attenuated signal of each channel then returns to the MUX/DMUX 31, and all channels are multiplexed and output to the DCE chip input port 301, then input into the input/output port 202 of the circulator and output from the output port 203 of the circulator 20 to the optical transmission line. Another function of the partially transparent reflective means 33 is signal tapping. The signal of each channel passing through the partially transparent reflective means 33 is detected by its corresponding detector 34 and sent to its corresponding channel monitoring element in the controller 40. Thus, the signal of each channel in the transmission line can be monitored by the controller, including its gain level. The gain level of each channel is then analysed and compared to its required gain level. The difference between them is fed into its corresponding VOA controlling element to adjust the attenuation level of its corresponding VOA, thus enabling each channel to reach its required gain level. By independently controlling each channel, the gain level of each channel in the transmission line can be dynamically equalized, as shown in FIG. 6. The controller 40 can also be used to monitor and control the DCE chip temperature.

Figure 5A:
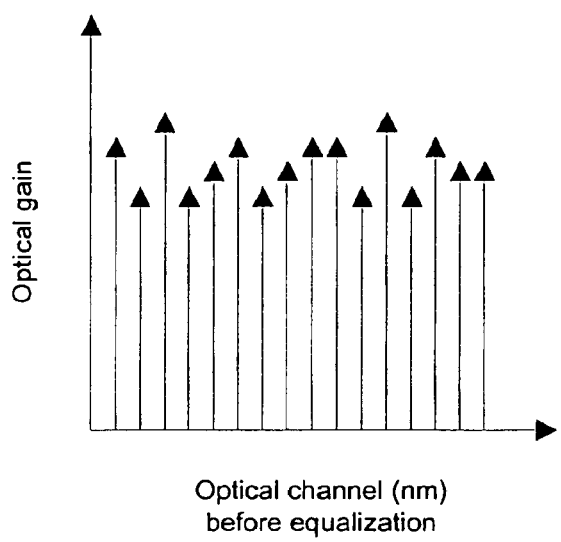
FIG. 5(a) shows a typical example of the non-uniformity of multi-channel optical signals transmitted in an optical transmitting line.
Figure 5B:
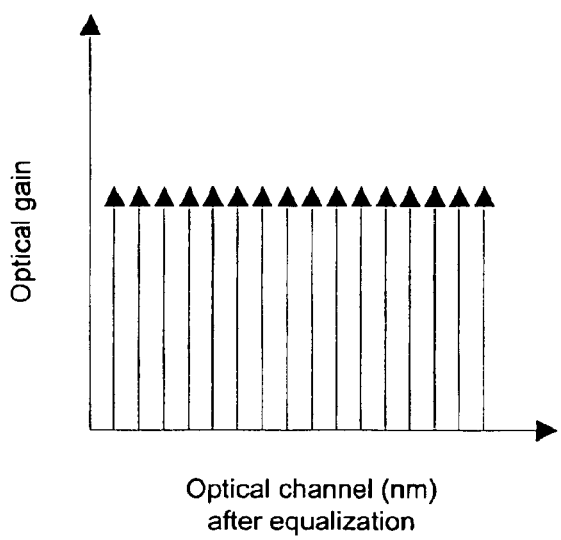
FIG. 5(b) shows a typical example of the achievable uniformity of multi-channel optical signals transmitted in an optical transmitting line by using the present invention.

FIG. 5(a) shows a typical example of the non-uniformity of multi-channel optical signals transmitted in an optical transmission line. As can be seen, the gain levels for the channels are not always equal. However, by using the dynamic channel equalizer described above, the gain levels shown in FIG. 5(a) can be equalized, as shown in FIG. 5(b).

A dynamic channel equalizer chip in the second preferred embodiment is illustrated in FIG. 6. It renders the device polarization insensitive. As shown in FIG. 6, a quarter wave plate 35 is inserted between the VOA array 32 and the partially transparent reflective means 33. The principle of operation is that a polarization conversion is performed by using the quarter wave plate 35 and the partially transparent reflective means 33. The thin quarter wave plate 35 is bonded to the facet of the VOA array, while the partially transparent reflective means 33 is actually a dielectric multilayered interference film formed on the surface of the quarter wave plate 35. An input channel signal from the DCE chip input port 301 is transmitted through the MUX/DMUX 31, the VOA array 32 and the quarter wave plate 35 and is then reflected by the partially reflective means 33. The reflected light is again transmitted through the quarter wave plate, the same VOA array 32 and the same MUX/DMUX 31. Since the light is transmitted through the quarter wave plate 35 twice, the quarter wave plate 35 and the reflective means 33 function as a polarization converter.

Assuming that there is no polarization conversion by using the quarter wave plate 35, since the components used for the dynamic channel equalizer have polarization dependence effect to a certain extent, the optical signals transmitted through the device will show different transmission performance when different polarization is incident, i.e., the transmission loss when horizontal polarization is incident is different from that when vertical polarization is incident. This gives the DCE a polarization dependence. In contrast, when the polarization converter is arranged as in FIG. 6, light passes through the same device twice but with the opposite polarization, thus cancelling the polarization effect and rendering the device polarization insensitive. For example, if in the first pass, light is horizontally polarized, the polarization converter will convert the light to be vertically polarized, then in the second pass, the light is vertically polarized. If in the first pass, light is vertically polarized, then in the second pass, light will be horizontally polarized due to the polarization converter.

Figure 7:
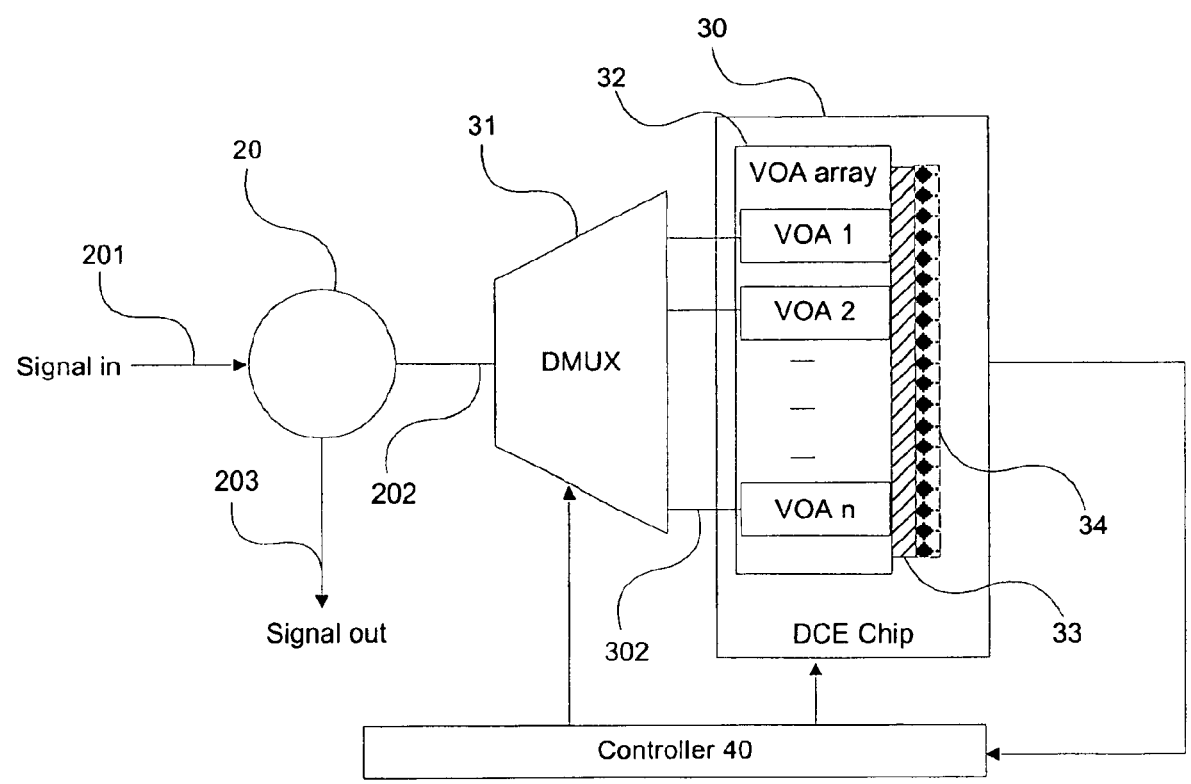
FIG. 7 is a block diagram showing another embodiment of the dynamic channel equalizer in accordance with the present invention.

In a third embodiment of the present invention as illustrated in FIG. 7, MUX/DMUX 31 is separated from the DCE chip 30. Each output channel of the multiplexer/demultiplexer is connected to its corresponding variable optical attenuator array 32 in the DCE chip by optical fibers 302. The operating principle of this embodiment is the same as in the first preferred embodiment and the second preferred embodiment. The advantage of this embodiment is that any type of multiplexer/demultiplexer can be used. In addition, any type of VOA array 32 can also be used, provided that the VOA array 32 is constructed as a block and can be coated with the partially reflective means 33 in the form of the dielectric multilayered thin film coating.

As will be clear to those of skill in the art, the dynamic channel equalizer of the present invention is inexpensive to produce, particularly as a number of the components can be integrated onto a single semiconductor chip. As compared to prior art optical equalizers, the present invention also results in a reduction in the number of components necessary to provide channel equalization.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A dynamic optical channel equalizer comprising:
   an optical demultiplexer for demulitplexing a received optical signal into a plurality of optical channel signals;
   a waveguide-based variable optical attenuator array having a plurality of variable optical attenuators, each variable optical attenuator for receiving and attenuating one of the plurality of optical channel signals;
   a partially transparent reflector, abutting the variable optical attenuator array, positioned to reflect a portion of each attenuated optical channel signal to an optical multiplexer, and to transmit a portion of the remainder of each attenuated optical channel signal; and
   an equalization controller for receiving the transmitted portions and for controlling each variable optical attenuator based on a comparison between a required gain level and an actual gain level of its respective optical channel signal to equalize channel gain.

2. The dynamic optical channel equalizer of claim 1, wherein a wave division multiplexer/demultiplexer forms both the optical demultiplexer and the optical multiplexer.

3. The dynamic optical channel equalizer of claim 2, wherein the received optical signal is fed to and received from the wave division multiplexer/demultiplexer by an optical circulator.

4. The dynamic optical channel equalizer of claim 2, wherein the reflected portion of each attenuated optical channel signal is reflected to the wave division multiplexer/demultiplexer through the variable optical attenuator array.

5. The dynamic optical channel equalizer of claim 1, wherein the partially transparent reflector is a dielectric multilayered interference film formed on a facet of the variable optical attenuator array.

6. The dynamic optical channel equalizer of claim 5, further including a channel detector array having a plurality of optical channel signal detectors for detecting an intensity of each of the transmitted portion, and for providing the detected intensities to the equalization controller, the channel detector array being bonded to the partially transparent reflector.

7. The dynamic optical channel equalizer of claim 1, further including a channel detector array having a plurality of optical channel signal detectors, each of the plurality of optical channel detectors for detecting an intensity of a respective transmitted portion, and for providing the detected intensities to the equalization controller.

8. The dynamic optical channel equalizer of claim 7, wherein the variable optical attenuator array, the partially transparent reflector and the channel detector array are integrated on a semiconductor chip.

9. The dynamic optical channel equalizer of claim 8, further including a quarter wave plate inserted between the variable optical attenuator array and the partially transparent reflector.

10. The dynamic optical channel equalizer of claim 9, wherein the quarter wave plate is bonded to the variable optical attenuator array.

11. The dynamic optical channel equalizer of claim 9, wherein the partially transparent reflector is a dielectric multilayered interference film formed on a surface of the quarter wave plate.

12. The dynamic optical channel equalizer of claim 8, wherein the equalization controller includes temperature monitoring means for monitoring the temperature of the semiconductor chip based on the actual gain levels.

13. The dynamic optical channel equalizer of claim 1, wherein each of the variable optical attenuators in the array is connected the demultiplexer by an optical waveguide.

* * * * *